United States Patent [19]

Reich

[11] Patent Number: 4,513,529
[45] Date of Patent: Apr. 30, 1985

[54] METHOD AND MEANS FOR PREVENTING FROST DAMAGE TO CROPS

[76] Inventor: Douglas R. Reich, 209 Gazelle, North, Fort Myers, Fla. 33903

[21] Appl. No.: 519,242

[22] Filed: Aug. 1, 1983

[51] Int. Cl.³ ............................................. A01G 13/00
[52] U.S. Cl. ........................................................ 47/2
[58] Field of Search ................ 47/2; 432/223, 88, 222

[56] References Cited

U.S. PATENT DOCUMENTS

| | | | |
|---|---|---|---|
| 2,658,308 | 11/1953 | Fowler, Jr. et al. | 432/222 |
| 2,712,714 | 7/1955 | McGee | 47/2 |
| 2,807,120 | 9/1957 | Graham | 47/2 |
| 3,003,282 | 10/1961 | Davies | 47/2 |
| 3,120,949 | 2/1964 | Robinson | 47/2 |
| 3,210,059 | 10/1965 | Nesbitt et al. | 432/222 |
| 3,570,828 | 3/1971 | Cowan | 432/223 |
| 4,138,675 | 2/1979 | Eakin | 47/2 |

*Primary Examiner*—Robert A. Hafer
*Assistant Examiner*—Bradley M. Lewis
*Attorney, Agent, or Firm*—James E. Nilles; James R. Custin

[57] ABSTRACT

A vehicle-mounted machine for preventing frost damage to growing crops comprises an upright shell that defines a plenum chamber, having an upwardly opening air inlet in its top and having plural rearwardly extending tubular heating chambers opening from its bottom portion. A fan coaxially mounted in the front of each heating chamber draws air from the plenum chamber and propels it across a propane burner that is coaxially mounted in the heating chamber behind the fan. Discharged air, mixed with combustion gases from the burner, has a temperature of about 45° F. and is emitted rearwardly downwardly and obliquely to both sides of the machine to mix with cold surface air. A field or grove protected by the machine is divided into a grid of equal-area zones, each having a high pole atop which there is a light that is turned on when a sensor near ground level detects a temperature above but near freezing. The machine moves to where it is needed, as indicated by lighting of the lights.

2 Claims, 7 Drawing Figures

METHOD AND MEANS FOR PREVENTING FROST DAMAGE TO CROPS

FIELD OF THE INVENTION

This invention relates to a method and apparatus for preventing frost damage to growing crops; and the invention is more particularly concerned with a highly fuel efficient and practically pollution-free method and apparatus for preventing frost damage to crops borne on trees and on lower growing plants, requiring a minimum of personnel for its successful operation in an orchard, grove or field of substantial area.

BACKGROUND OF THE PRIOR ART

There are many types of crops that are subject to frost damage, including both orchard crops and crops such as peppers that are borne on low-growing plants. However, it is well known that citrus fruits are especially likely to be damaged by freezing temperatures and that methods and means for preventing frost damage to citrus crops are of great concern. The present invention will therefore be described in relation to citrus fruit groves, but this is by way of a particularly important example, inasmuch as the invention is useful with other tree-borne crops and with field crops.

Citrus grove frost damage prevention is concerned with protecting the fruit on the trees rather than the trees themselves. Citrus trees are not ordinarily damaged by frost, but the fruit is ruined for commercial purposes if its water content freezes.

Heretofore three general methods have been employed for preventing frost damage in citrus groves. In one of these, fairly intense heat was generated locally at each of numerous points distributed through the grove; in another the air in the grove was stirred up to mix cold air just above the ground with warmer air from a higher level; and in the third, water was sprayed into the air to warm it.

At one time the most commonly used device for preventing citrus grove frost damage was the smudge pot and smudge pots are still used to a substantial extent. Smudge pots, which are containers of burning oil, are spaced through a grove at regular intervals at about 20 feet (about 6 meters) so that there are about 100 of them in each acre of grove. When the temperature drops to a threatening level, the smudge pots are ignited in the hope that they will generate enough heat to prevent frost damage to the fruit.

Smudge pots—so called because they burn oil with a characteristic smokey flame—present a serious air pollution problem that has been tolerated only as an alternative to accepting major economic losses in citrus groves.

To the citrus grower, pollution is undoubtedly a matter of concern, but a more serious objection is the high cost of operating smudge pots. On average, smudging requires 50 gallons of oil per acre per hour. The average frost danger period lasts about three hours, and with fuel oil paced at around one dollar per gallon, the fuel cost of protecting an acre of crop from an average frost is about $150. In addition, one laborer is needed for servicing about four acres of smudge pots. In a severe season, with several frosts or a few very prolonged periods of frost, the cost of smudging may well be so high as to raise the question of whether it would not be just as well to abandon the crop.

The air stirring expedient most often used in citrus groves is the wind machine, consisting of a large propeller, driven by a powerful engine. It is intended to mix the warmer air from just above the trees with the cold layer of air that forms among them. To be effective, a wind machine must necessarily consume a substantial amount of fuel. Since one wind machine can stir up air in only a limited area, a grove of any substantial size has to have a number of wind machines, each representing a substantial investment that is idle most of the time. Helicopters have been employed as a substitute for wind machines, but operating a helicopter is by no means inexpensive, and it requires an especially skilled pilot because the helicopter has to be flown at treetop level to be effective. Of course air mixing cannot be successful in any case if the higher level air is not warm enough.

Water spraying, which has the advantage of being non-polluting, puts heat into the air. But it can only be effective if enough sprays are used, each putting out an adequate volume of water. Therefore, water spraying not only requires the presence of a plentiful water supply but involves a large investment in pumping equipment and demands a high energy expenditure for pumping the water.

In the light of the present invention, these prior expedients for preventing frost damage can now be seen as inefficient because they did not take into account the conditions that create the possibility of such damage. In regions where citrus fruits are grown, frost conditions usually develop when the air is calm, or nearly so. As the ground loses its heat, small areas cool more rapidly than the rest of the ground, and the air over such cold areas, no longer heated by upward radiation, cools correspondingly and settles through the trees, displacing warm air upwardly in adjacent areas. If the subsiding air is cold enough, and remains in contact with the fruit long enough, the juice freezes—at least in parts of the fruit—and the crop is damaged.

Smudging tends to create very localized hot spots near ground level and generates correspondingly narrow rising currents of heated air. Because the air in these updrafts is so much hotter than the surrounding air, they rise at a high velocity, and consequently little horizontal mixing takes place. The dense smoke from smudging tends to block upward radiation, and thereby prevents some loss of heat, but much of the oil is wasted in convective heating of the air above the trees. Because of the lack of horizontal mixing, there can still be crop damage at locations between smudge pots, especially if the atmosphere is unusually cold.

Air mixing and water spraying involve much larger capital investments than smudging and, in addition, demand high expenditures for energy.

A fact not heretofore taken into account in applying any of these expedients is that a citrus grove ordinarily has one or more trouble spots where frost usually develops first and is most severe, and it has other areas which are less likely to sustain crop damage. With smudging in particular, efficient employment of manpower seldom accords with efficient operation of the smudge pots. Ordinarily the trouble spots can not be identified, but even if they are known, it is not always feasible to light the smudge pots in the trouble spots first and then work out towards the relatively frost-immune areas. What this means is that a certain amount of fuel is wasted in combatting frost that has not developed and may not develop. The same considerations obviously apply to the use of wind machines, helicopters and water sprays.

SUMMARY OF THE INVENTION

The general object of the present invention is to provide a very fuel efficient method and apparatus for preventing frost damage to crops, including tree-borne crops and those borne by lower growing plants, capable of being operated successfully with a minimum of personnel, and whereby air in the crop growing area is heated in such a manner as to promote extensive horizontal mixing between cold and warm air, so as to prevent spot damage such as can occur between smudge pots.

Another and very important object of this invention is to provide fuel efficient and substantially pollution-free apparatus for so heating and stirring the air in a crop growing area as to assuredly prevent threatened frost damage to the crop.

Another and more specific object of the invention is to provide mobile apparatus of the character described whereby air is drawn down from a relatively high level—approximately the level of the tops of citrus trees—at a substantially high flow rate, is heated to a moderate temperature, and, so heated, is discharged horizontally at a level near the ground, to mix with and disperse the coldest layer of air.

A further object of the invention is to provide a method and apparatus for preventing frost damage to crops that operates in a rational and fuel efficient manner in that it provides for identification of frost damage trouble spots when and as they are developing and enables each trouble spot to be dealt with promptly, achieves such operation with a minimum of personnel, and is highly fuel efficient because it ihvolves heating a large volume of air per unit time to a comparatively low temperature and discharging such air in a manner that promotes horizontal mixing.

It is also an object of this invention to provide mobile and substantially self-contained frost combatting apparatus that is capable of moving steadily through an orchard, grove or field to maintain a constant and effective heating and horizontal mixing of the air, and thus also capable of operating earliest and most often in the trouble spots, to expend heat and power energy when and where it is actually needed.

A further object of the invention is to provide a method of preventing frost damage in an orchard, grove or field, whereby two or three persons, utilizing apparatus of the character described, can successfully and very efficiently protect an area of average size.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
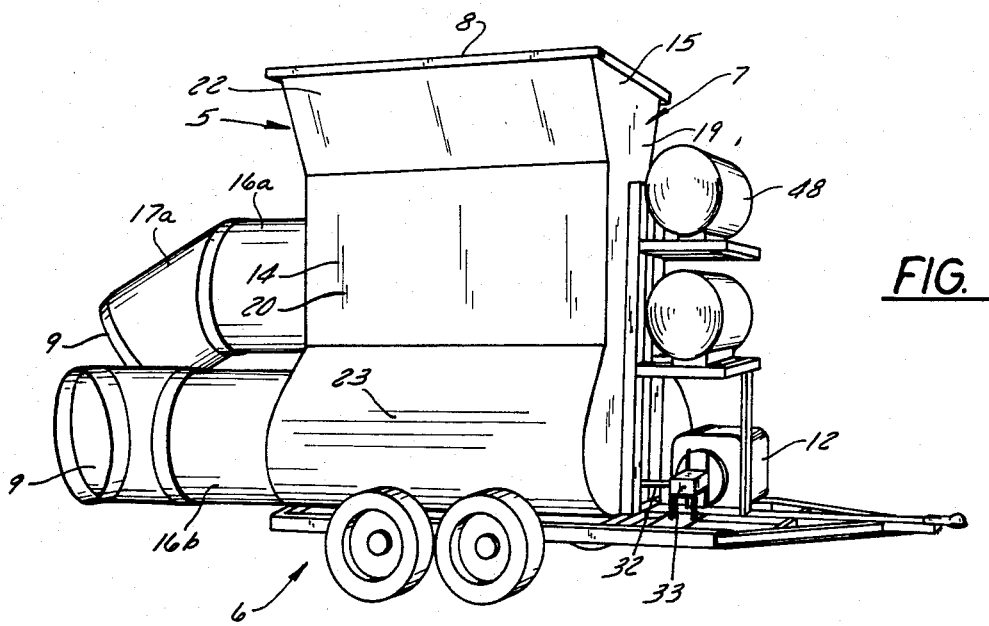
FIG. 1 is a perspective view of a machine embodying the principles of this invention.
Figure 2:
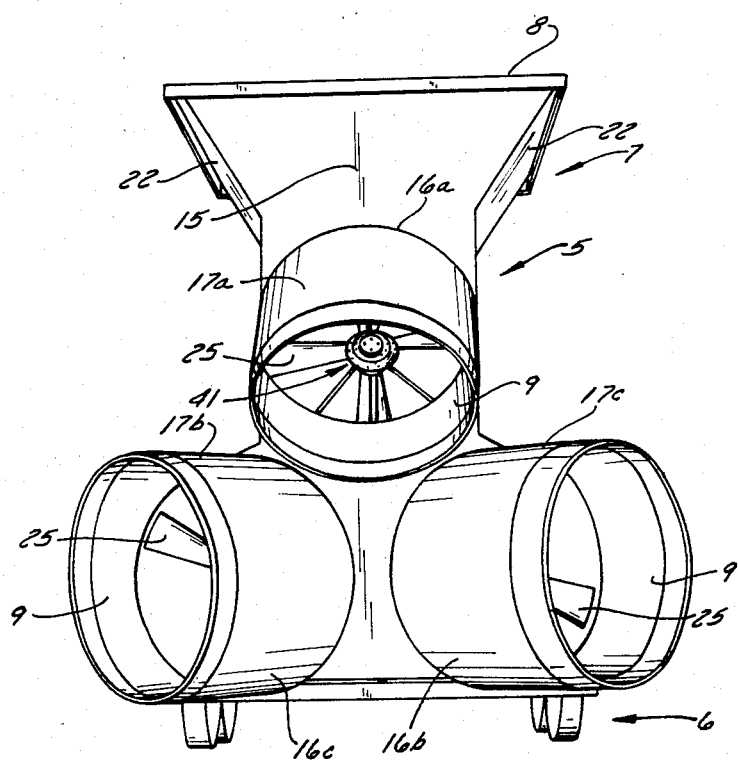
FIG. 2 is a rear perspective view of the machine.
Figure 4:
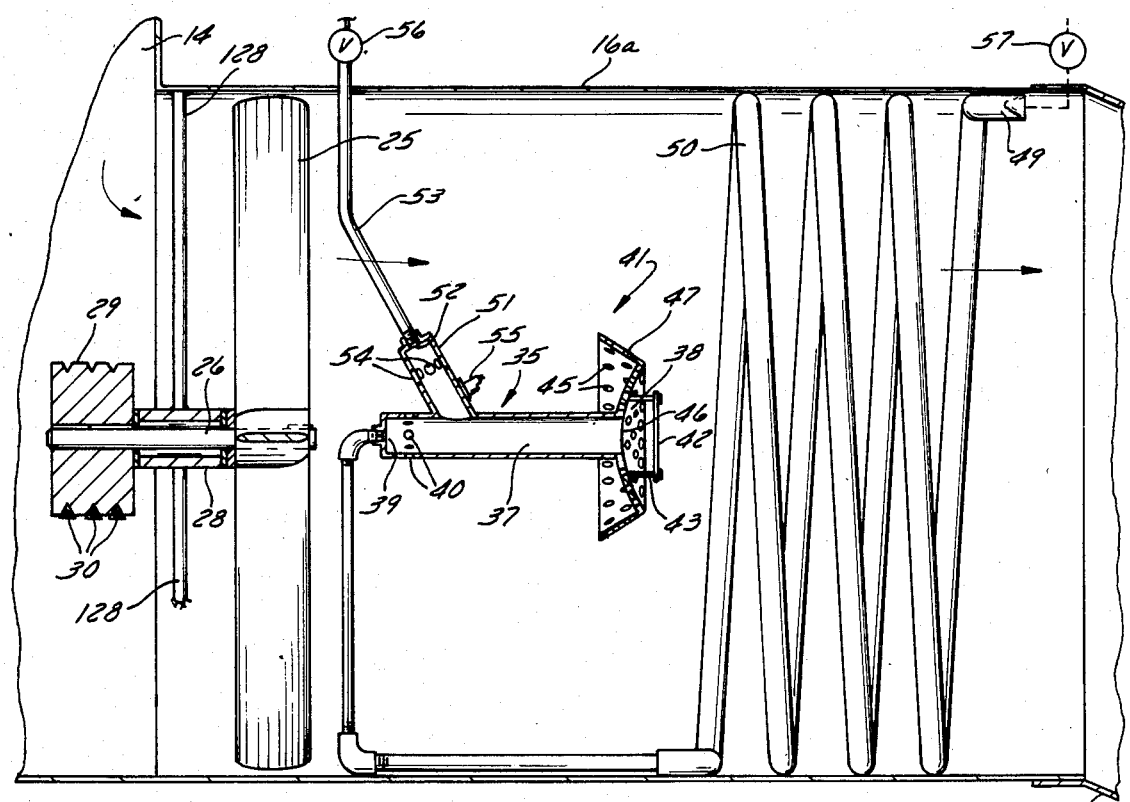
FIG. 4 is a view in section, on a larger scale, taken on the axis of one of the heating chambers.
Figure 3:
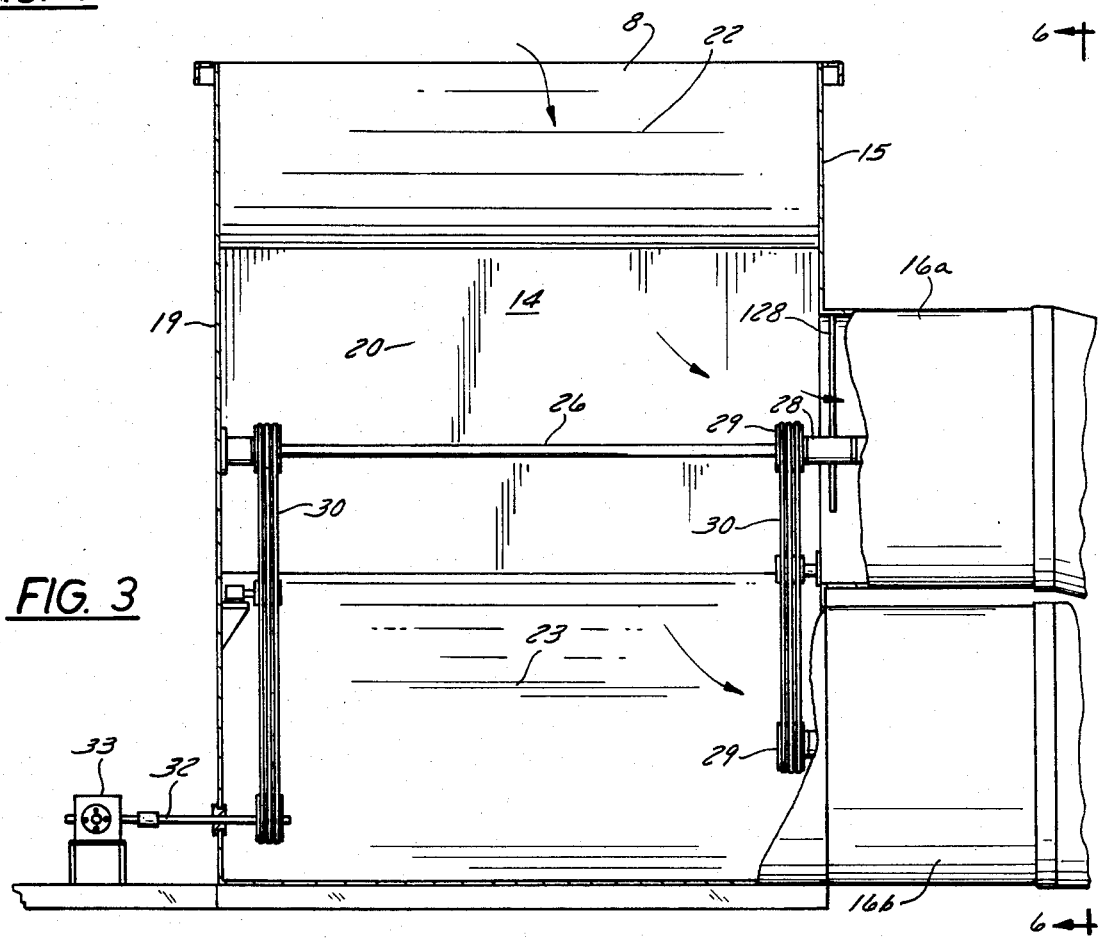
FIG. 3 is a view of the machine, mainly in vertical section on the plane of symmetry.
Figure 6:
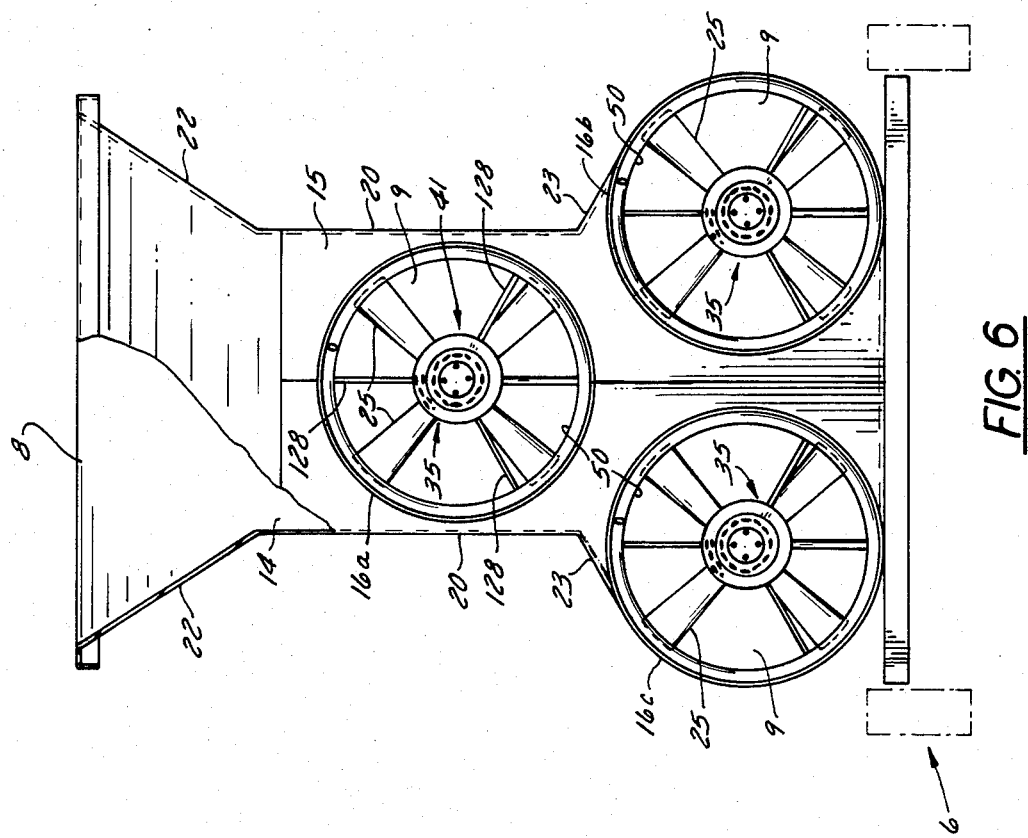
FIG. 6 is a view partly in rear elevation and partly in section on the plane of the line 6—6 in FIG. 3.
Figure 5:
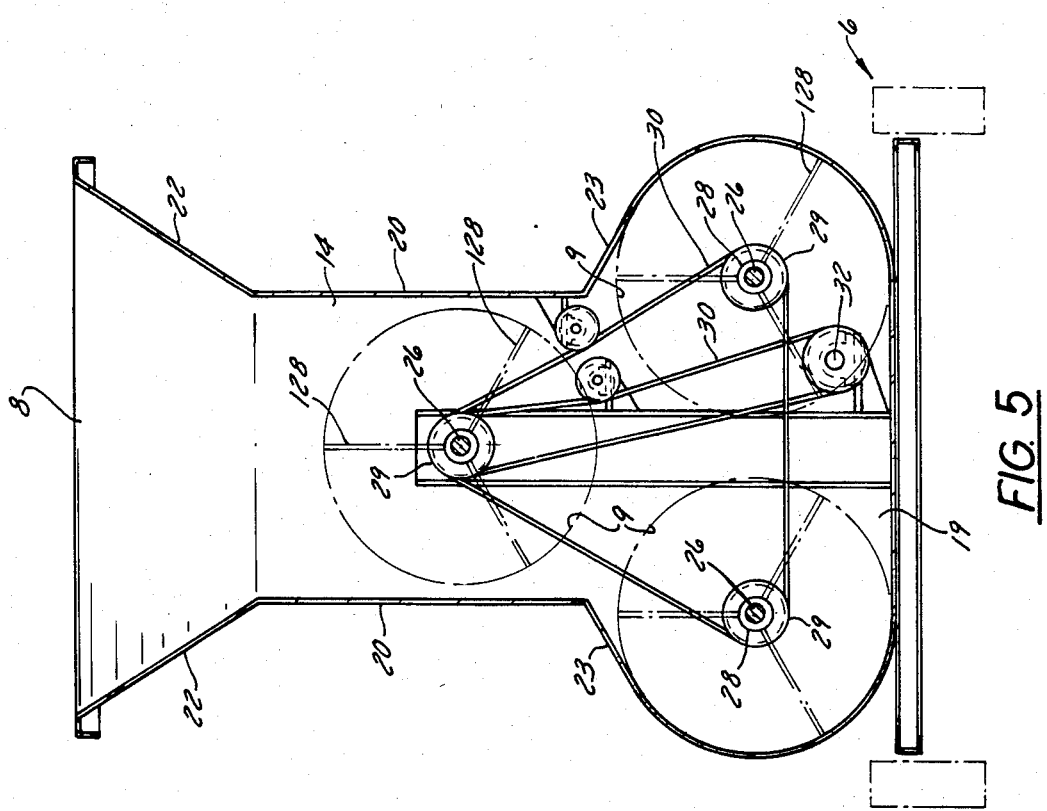
FIG. 5 is a view in vertical section, taken on a plane just in front of the rear wall of the plenum chamber, looking forward.
Figure 7:
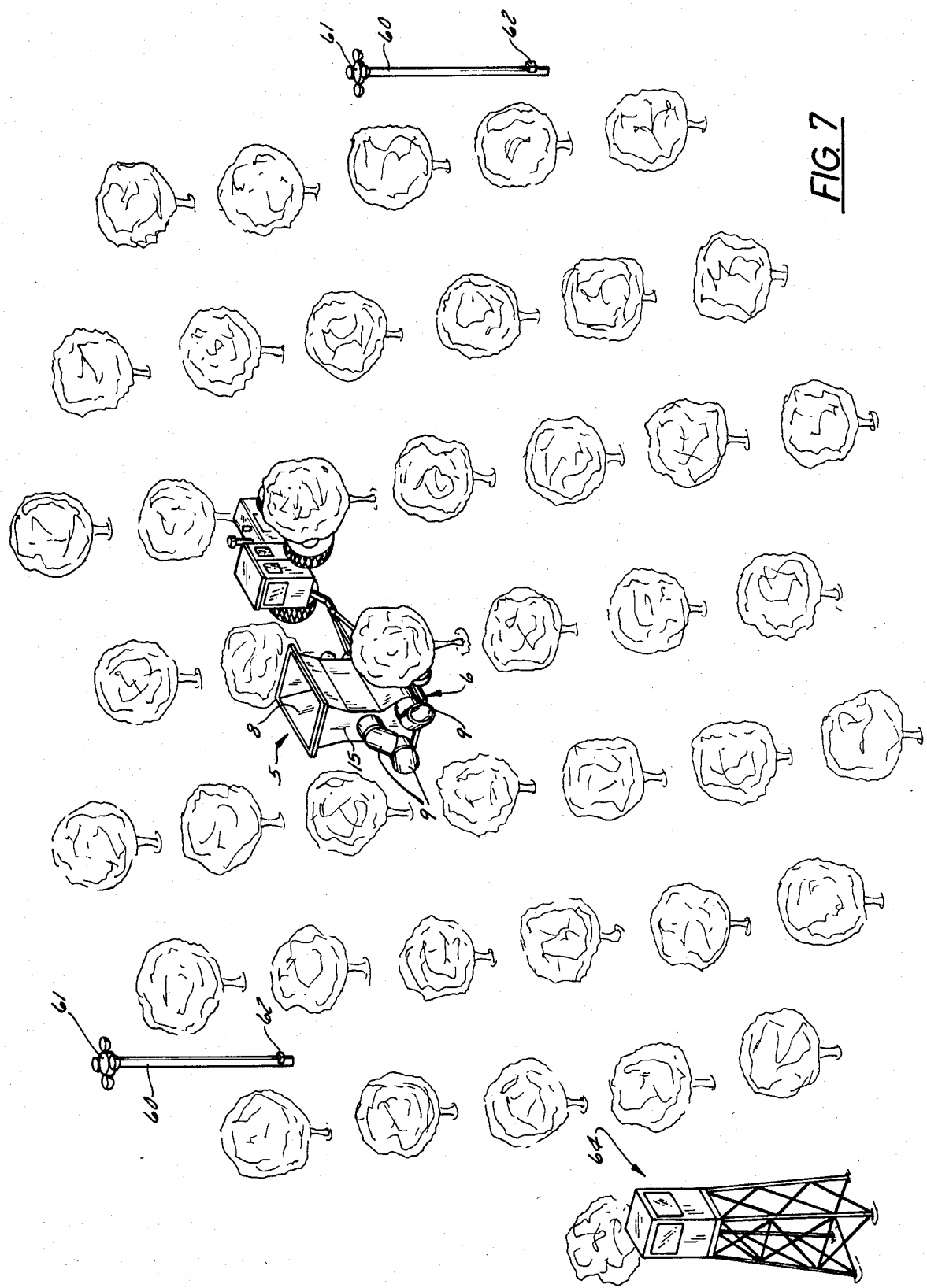
FIG. 7 is a perspective view of a citrus grove wherein frost damage is being prevented in accordance with principles of this invention.

A machine 5 that embodies the principles of this invention, for preventing frost damage to orchards, citrus groves and field crops, is preferably mounted on a wheeled vehicle 6, to be moved substantially constantly while it is in operation, in order to be optimally effective. The vehicle 6 can be a small tractor-drawn flat bed trailer, as herein shown, or can be self-propelled and of a type otherwise used for carrying crop spraying apparatus.

In general the machine 5 comprises a shell or housing 7 which has an upwardly opening air inlet 8 at its top and has air outlets 9 at or near its bottom that discharge substantially horizontally, preferably in somewhat divergent, generally rearward directions. Inside the shell 7 are blowers 25 and fuel burners 35 which are so arranged as to draw air downwardly into the inlet 8 at a high rate of flow, heat the indrawn air, and then discharge it through the outlets 9.

The housing 7 is so dimensioned that its air inlet 8 is carried at a fairly high level, preferably at about the height of the tops of citrus trees. For most purposes the air inlet 8 can be about 15 feet above the ground, as a practical compromise between topheaviness of the vehicle 6 with the machine 5 mounted upon it and reduction of the amount of cold air that the machine would draw past fruit in the upper portions of citrus trees under severe frost conditions.

The blowers 25, together, have sufficient capacity to move air at the rate of, for example, 140,000 to 145,000 cu. ft. per minute; and to that end the blowers are preferably driven by an internal combustion engine 12 that is mounted on the vehicle 6. In a typical application, an automobile or industrial engine of about 40 hp or more can be used for powering the blowers.

Because air is discharged from the air outlets 9 at a high volume rate and substantially horizontally, there is substantial mixing of the discharged air with the cold air at ground level. Furthermore, the air is discharged obliquely to each side of the machine as well as straight rearwardly, so that mixing of the discharged air with the ambient air takes place along a broad zone (about 145 ft. wide) as the machine moves along.

The discharged air is warm, but it is not highly heated. Typically, the air passed through the machine is discharged at a temperature of about 45° F. (7° C.), and therefore the machine poses no danger to a person touching any part of its shell or entering the airstream from it, nor does the discharged air cause any damage to low-growing crops. It is not necessary for the discharged air to be heated to a higher temperature because frost damage is avoided simply by preventing the fruit from remaining in contact with subfreezing air through the time that it takes for the fruit to be cooled to freezing temperature. Thus, if the air in contact with the fruit is periodically raised above freezing temperature—for example, brought up to 40° F. once an hour—then even though the fruit is in air at sub-freezing temperatures during a small part of each hour, the fruit will not lose enough heat for freezing to take place, and the frost cycle will be effectively broken.

Turning now to a more detailed consideration of the machine 5, its shell or housing 7 comprises a relatively large plenum chamber 14 that can be substantially rectangular in horizontal cross-section and can be symmetrical to a fore-and-aft extending vertical plane. The shell 7 also comprises three duct-like heating chambers, 16a, 16b, 16c, which project rearwardly from the plenum chamber 14. Each heating chamber is essentially a cylindrical tube that has its front end portion received in a closely fitting hole in the vertical rear wall 15 of the plenum chamber, to be unrestrictedly communicated with the interior of the plenum chamber 14. A weldment around each heating chamber tube can secure it rigidly and airtightly to the rear wall 15. On the rear end of each heating chamber 16a, 16b, 6c is a short elbow 17a, 17b, 17c, respectively, into which the heating chamber opens unrestrictedly and which provides one of the discharge outlets 9 of the machine.

The axes of the three cylindrical heating chambers 16a, 6b, 16c are horizontal and extend fore-and-aft parallel to one another. One of the heating chambers, designated by 16a, is about midway between the top and bottom of the plenum chamber and has its axis contained in the above mentioned plane of symmetry. The other two heating chambers 16b and 16c are at the bottom of the plenum chamber, spaced to opposite sides of said plane of symmetry. The elbow 17a on the upper heating chamber 16a is curved to discharge air obliquely downwardly, at an angle of about 30° to the horizontal, to direct it towards the ground. The elbows 17b and 17c on the lower heating chambers 16b, 16c are curved through about 60° in opposite horizontal directions, to direct discharged air obliquely to opposite sides of the path of the vehicle 6.

The rear wall 15 of the plenum chamber is flat and vertical, and its front wall 19 is likewise flat and parallel to the rear wall. The front wall can have a service door (not shown) for access to the blower fan bearings and drive belts that are described hereinafter. Each of the plenum chamber side walls 20 has a vertical intermediate portion that extends through the region of the upper heating chamber 16a, but the upper portions 22 of the side walls are upwardly and laterally outwardly inclined so that the top portion of the plenum chamber converges downwardly from the upwardly opening air inlet 8. The bottom portion 23 of each plenum chamber side wall is arcuately bulged outwardly as a cylinder segment that conforms to the cylindrical wall of its rearwardly adjacent heating chamber 16b or 16c.

The blowers 25 comprise propeller fans, one for each of the heating chambers 16a, 16b, 16c, each located in the front end of its heating chamber, a small distance behind the plane of the rear wall 15 of the plenum chamber. The diameter of each fan 25 is such that its blade tips are radially spaced by only a small distance from the tubular wall of its heating chamber. Each fan is secured for rotation to a fan shaft 26 that is coaxial with its heating chamber. Bearings 28 for the fan shafts 26 are mounted on struts 128 that are secured to the heating chamber walls. Coaxially secured to each fan shaft 26 is a multiple-belt sheave 29 around which drive belts 30 are trained. The several fans are driven through the belts 30 from a horizontally extending drive shaft 32 in the bottom portion of the shell that has its axis parallel to the plane of symmetry and the front end of which projects through and beyond the front wall 19 of the plenum chamber to be coupled, through a speed reducing gear transmission 33, to the engine 12 that powers the blowers.

Concentrically mounted in each of the heating chambers 16a, 16b, 16c, behind its fan, is a fuel burner 35. It will be evident that every fuel burner must be capable of operating in a stream of fast moving air and of rapidly transferring its heat output to the air flowing past it. A preferred form of fuel burner for the machine of this invention operates on liquefied propane gas and is essentially like the gas burner disclosed in U.S. Pat. No. 3,689,040, issued to D. R. Reich in 1972. Such a burner is particularly suitable because it effects substantially complete combustion and discharges nonpolluting combustion products directly into the air moving past it.

In general, each of the gas burners 35 has an axially elongated cup-shaped primary combustion chamber 37 that opens rearwardly to a coaxial, annular, radially outwardly opening secondary combustion chamber 38. The primary combustion chamber 37 has a rearwardly opening fuel gas inlet 39 in its closed front end and has circumferentially spaced air inlets 40 in the front portion of its side wall through which primary combustion air is drawn into and mixed with the stream of gas flowing rearwardly from the gas inlet 39. Apparently because propane is heavier than air, it has been found that the gas inlet 39 is best located a little above the axis of the primary combustion chamber.

On the open rear end of the primary combustion chamber 37 there is a relatively large, radially outwardly projecting circumferential flange 41 that provides the front wall of the annular secondary combustion chamber 38. The rear wall of the secondary combustion chamber is a baffle disc 42 that is held in rearwardly spaced concentric relation to the cup-shaped primary combustion chamber 37 and the annular flange 41 by means of short, circumferentially distributed, axially extending struts 43 that are connected to the disc 42 and the flange 41. The baffle disc 42 is substantially larger in diameter than the cylindrical primary combustion chamber 37 but substantially smaller in diameter than the annular flange 41.

It will be apparent that combustion of rearwardly flowing fuel gas mixed with primary combustion air begins in the primary combustion chamber 37 and continues as the mixture flows rearwardly out of it and impinges the baffle disc 42, to be thereby deflected radially outwardly in all directions through the secondary combustion chamber 38.

The high velocity airstream flowing rearwardly along the outside of the primary combustion chamber is mainly deflected radially outwardly by the large diameter flange 41. However, that flange has numerous apertures 45 through it, in a concentric annular zone that has its radially inner boundary on a radius approximately equal to that of the baffle disc 42. The apertures 45 serve as inlets through which combustion air enters the secondary combustion chamber 38.

The large annular flange 41 has a rearwardly concave central portion 46 which cooperates with the baffle disc 42 to give the secondary combustion chamber 38 a radially outward convergence, for accelerating the combusting mixture as it flows radially outwardly and past the secondary combustion air inlets 45. The radially outermost portion 47 of the annular flange 41 is frustoconical, diverging forwardly, to provide better deflection of the passing airstream as well as increased turbulence behind the flange 41, whereby the hot combustion products issuing from the burner are thoroughly mixed with the passing airstream from the fan. Because of the complete combustion, the gases discharged into the airstream are harmless, consisting essentially only of water vapor and carbon dioxide.

For adequate and reliable fuel flow at the rates of combustion needed in the machine of this invention, liquefied propane must be drawn from the bottom of a tank (propane is heavier than air), but if liquid propane is continuously drawn from a tank at a fairly high rate, it can freeze after a time and stop flowing. Therefore, propane from a tank 48 mounted on the carrying vehicle 6 is conducted to each of the burners 35 through a tube 49 which is in part formed as a helical coil 50 that is concentrically mounted in the heating chamber a short distance behind the burner. The heated air that has passed the burner 35 thus warms the coil 50 and prevents freeze-up of propane being delivered to the burner.

Although each burner 35 normally operates on fuel drawn from the bottom of the tank 48, it is started on fuel drawn from the top of the tank, where there is always a certain amount of fuel that is in the gaseous state and under pressure. To that end, each burner has a starting combustion chamber 51 which is cylindrical and cup-shaped like the primary combustion chamber 37 and which opens obliquely rearwardly and downwardly into the primary combustion chamber, behind its air inlets 40, forming a Y with it. At its closed front end the starting combustion chamber 51 has a substantially concentric gas inlet 52 that is communicated through a duct 53 with the top of the fuel tank 48, and a small distance behind its front end it has circumferentially spaced combustion air inlets 54. An electrical igniter 55 is mounted in the cylindrical wall of the starting chamber, between its air inlets 54 and its junction with the primary combustion chamber 37. For starting the burner, a valve 56 that controls the upper tank outlet is opened, the igniter 55 is energized, and a valve 57 that controls the bottom tank outlet is maintained closed. After about ten seconds, when combustion is fully under way, the valve 57 can be opened so that the burner can operate at full capacity, and the valve 56 and igniter 55 can be turned off. Although manual control of the starting sequence is entirely feasible, it will be apparent that an automatic system comprising time delay relays can be readily provided.

For compactness, it is desirable that the tank 48 be a standard one of 163-gal. capacity, readily mounted on the vehicle 6. This provides enough fuel to operate the machine for at least an average three-hour defrosting period; and notwithstanding the comparatively small heat transfer surface area of such a tank, the coil 50 (typically made of 52 ft. of stainless steel tubing) allows propane to be drawn from the tank at the same rate that it could be used from a standard 500-gal. tank without preheating.

The vehicle 6 is moved at a speed to cover about 60 acres in an hour, which is about the same speed used for crop spraying from a surface vehicle; and it can be operated by one person since the machine 5, once started, needs no further attention. The number of machines needed for adequate protection against even a comparatively bad frost need not be more than one per 60 acres, especially if the machines are moved in a manner to concentrate their operations on the trouble spots, where and when frost is likely to develop, and thus utilize them with best efficiency.

For such efficient utilization, the orchard, grove or field is subdivided into plots of about one acre each, arranged in a grid system so that each such plot can be readily identified. At the center of each plot is a pole 60 that projects up to above treetop level and has a high intensity light 61 mounted at its top. Each light 61 is controlled by a thermally responsive switch 62, mounted on the pole 60 just above ground level, whereby the light is turned on when temperature at the switch falls to a critical level that is above the freezing point but near it, e.g., 38° F. (3° C.). A controller stationed in a tower 64 from which he can see all of the lights 61 communicates by radio with the operator of the vehicle 6 that carries the machine 5, directing the operator to each in turn of the plots at which a light has turned on.

From the foregoing description taken with the accompanying drawings it will be apparent that this invention provides a highly fuel efficient and nonpolluting method and apparatus for effectively preventing frost damage to both tree-borne crops and crops borne on lower-growing plants, and that the apparatus of this invention is capable of being operated with a minimum of personnel.

What is claimed as the invention is:

1. Apparatus for preventing frost damage to growing crops, of the type comprising a shell movable over the ground in a forward direction, blower means in said shell for drawing air thereinto through an air inlet therein and expelling it therefrom through outlet means therein, and fuel burning heater means in said shell for heating the expelled air, said apparatus being characterized by:
    A. said shell comprising front, rear and side walls defining a plenum chamber which is substantially symmetrical to a vertical plane extending through said front and rear walls and which has an open top that provides said air inlet;
    B. said shell further comprising three tubes projecting substantially rearwardly from said rear wall of the plenum chamber,
        (1) each substantially unrestrictedly opening at its front end into the interior of said plenum chamber and
        (2) each having its rear end portion formed to provide an air discharge outlet which cooperates with the air discharge outlets of the other tubes to comprise said outlet means,
        (3) two of said tubes being at the bottom of said plenum chamber, spaced to opposite sides of said plane and having their rear end portions arranged to discharge air near ground level in obliquely rearwardly and laterally divergently directed streams that flow along the ground, and
        (4) the third of said tubes being upwardly adjacent to said two tubes and having its rear end portion arranged to discharge air in an obliquely downwardly and rearwardly directed stream that flows along the ground;
    C. said blower means comprising an air propeller coaxially rotatable in each of said tubes, near the front end thereof, for drawing air from said plenum chamber and forcing it rearwardly through the tube;
    D. said heater means comprising a fuel burner substantially coaxially mounted in each of said tubes, spaced rearwardly from the propeller therein and forwardly from said rear end portion thereof;
    E. deflecting means in each tube, adjacent to the fuel burner therein, arranged to impart radially outward deflection to air flowing through the tube and to hot combustion gases issuing from the burner means, so that the stream issuing from the tube is substantially uniformly at a temperature substantially above freezing but low enough to be harmless to persons and plant life;

F. a propeller shaft for each propeller by which the propeller can be rotatably driven, each said shaft having a rear end portion on which its propeller is mounted and having a front end portion in said plenum chamber;

G. a drive shaft in the bottom portion of said plenum chamber having a front end portion that projects through the front wall of the plenum chamber for coupling to power drive means; and H. transmission means in the plenum chamber drivingly connecting said drive shaft with each of said propeller shafts.

2. Apparatus for preventing frost damage to growing crops, of the type comprising a shell movable over the ground in a forward direction and having an air inlet and a discharge outlet, blower means in said shell for drawing air into said inlet and expelling it through said outlet, and fuel burning heater means in said shell for heating the discharged air, said apparatus being characterized by:

A. said shell defining a substantially upright plenum chamber having said air inlet at its top at a level substantially above the ground, and having an upright transversely extending front wall;

B. said shell further defining at least one duct-like heating chamber that
  (1) projects rearward from said plenum chamber near the bottom thereof,
  (2) has a front end that is spaced rearward from said front wall and is unrestrictedly communicated with the bottom of the plenum chamber, and
  (3) has its rear end portion formed to provide said outlet;

C. said blower means comprising a propeller fan coaxially rotatable in said heating chamber adjacent to the front end thereof to draw air into the plenum chamber through said inlet and propel it rearward through the heating chamber for discharge from said outlet as a stream;

D. said rear end portion of the heating chamber being located and arranged to discharge said stream near ground level and for generally rearward flow along the ground;

E. said heater means being in said heating chamber, in substantially coaxial relation thereto, spaced to the rear of said propeller fan and spaced forwardly from said rear end portion;

F. deflecting means in the heating chamber, adjacent to the heater means, arranged to impart radially outward deflection to air flowing through the heating chamber and to hot combustion gases issuing from the heater means, to mix them so that said stream is substantially uniformly at a temperature that is substantially above freezing but low enough to be harmless to persons and plant life; and G. means for rotatably driving said propeller fan comprising
  (1) an engine mounted outside said shell, forwardly adjacent to said front wall,
  (2) a rotatable shaft extending through said front wall and having a front end connected with said engine; and
  (3) means in said plenum chamber drivingly connecting said shaft with the propeller fan.

* * * * *